J. E. HENDERSON.
SAFETY DEVICE FOR ELECTRIC CARS.
APPLICATION FILED MAY 6, 1913.

1,094,564.

Patented Apr. 28, 1914.
2 SHEETS—SHEET 1.

Witnesses
Wm. C. Prickett
Horace Welch

Inventor
James E. Henderson
By
Attorney

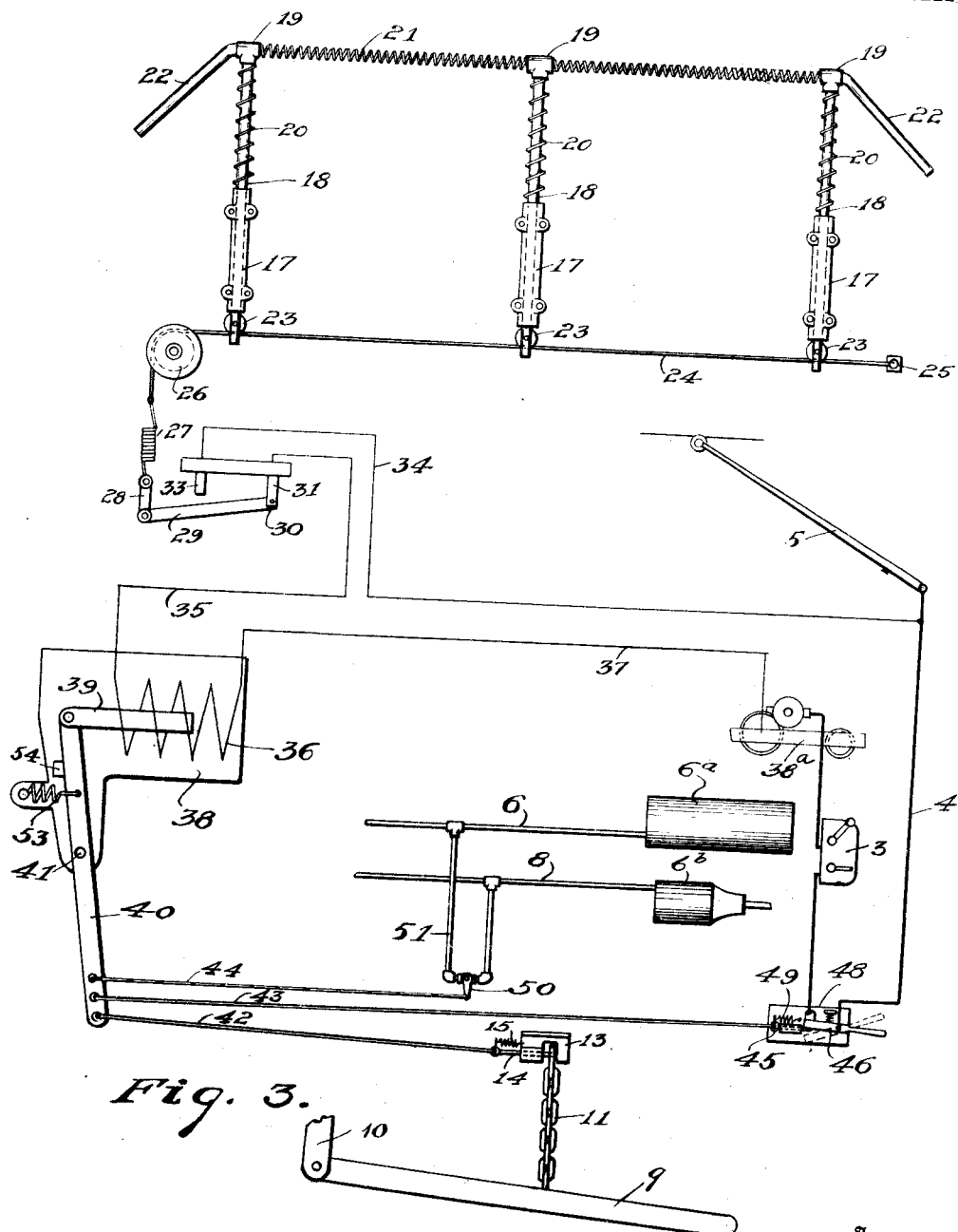

UNITED STATES PATENT OFFICE.

JAMES E. HENDERSON, OF BIRMINGHAM, ALABAMA.

SAFETY DEVICE FOR ELECTRIC CARS.

1,094,564. Specification of Letters Patent. Patented Apr. 28, 1914.

Application filed May 6, 1913. Serial No. 765,936.

*To all whom it may concern:*

Be it known that I, JAMES E. HENDERSON, a citizen of the United States of America, residing at Birmingham, in the county of Jefferson and State of Alabama, have invented certain new and useful Improvements in Safety Devices for Electric Cars, of which the following is a specification.

My invention relates to an apparatus designed to automatically drop the car fender and stop the car when a person or obstacle is struck.

One object of my invention is to design a new and improved form of buffer attachment which is constructed and yieldingly mounted on the car so that it will inflict the smallest possible injury to the person that it strikes.

A further object of my invention is to adapt this buffer, when any part thereof is pressed inwardly by striking against an object, to automatically operate various devices calculated to most effectively protect the person struck.

In my preferred arrangement the buffer will release the ordinary car fender and permit it to drop to the ground, thereby protecting the person struck from getting under the wheels; it is also adapted to open a make and break switch in the main line circuit to the controller and cut off current from the motors; it also, in cases where the car carries an air brake system, is adapted to operate a valve to apply the brakes.

A further object of my invention consists in the novel means by which the buffer acts to operate the devices described and in the various other novel details of construction and arrangements of parts which are hereinafter more particularly described and claimed, reference being had to the accompanying drawings, in which:—

Figure 1:
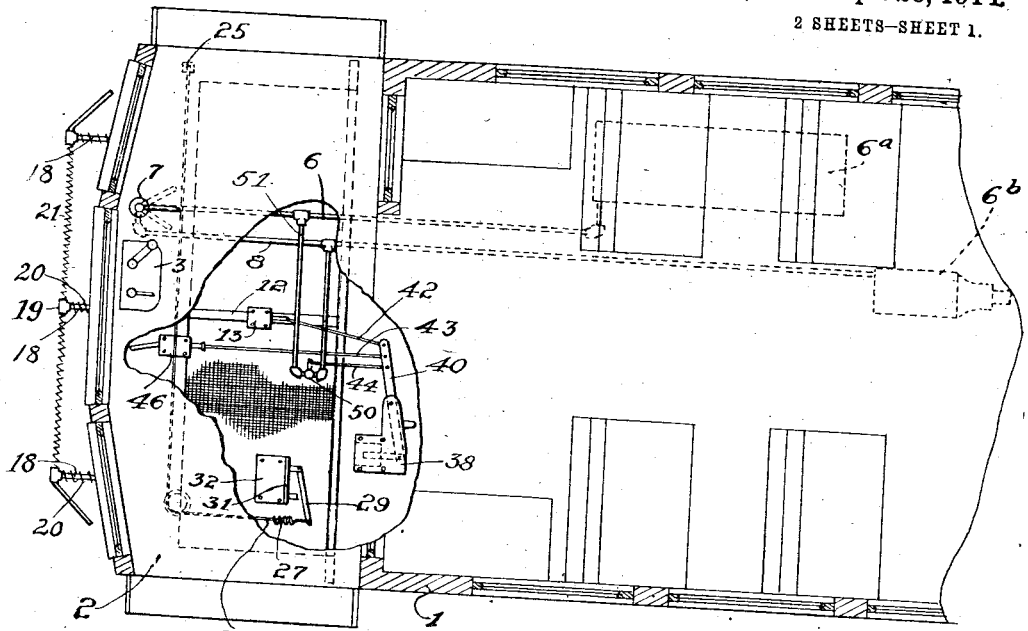
Figure 2:
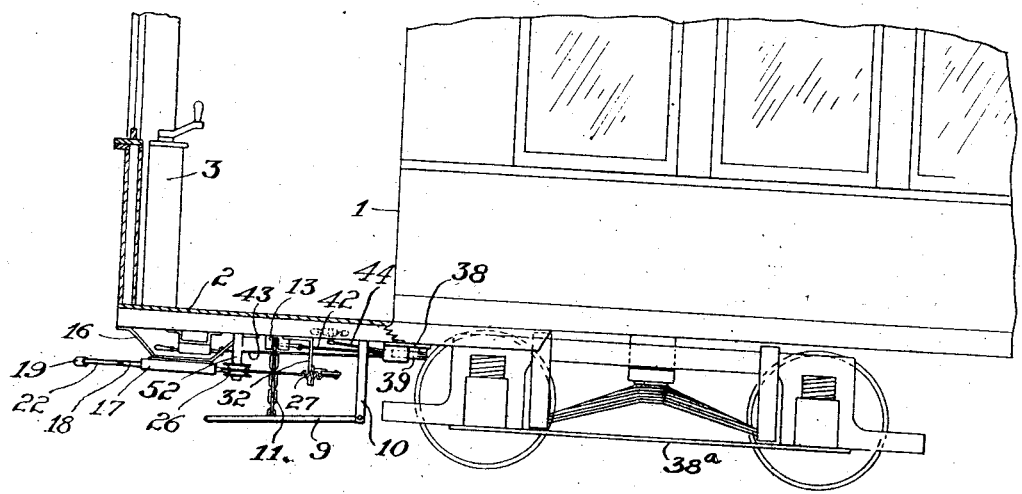

Figure 1 is a top plan view partly broken away of an electric motor car equipped with my invention. Fig. 2 is a side elevation of Fig. 1; and Fig. 3 is a diagrammatic view illustrating the several operating parts, and showing in plan view the details of the buffer.

Similar reference numerals refer to similar parts throughout the drawings.

According to the preferred embodiment of my invention, I show a motor car 1 having a front platform 2, a controller 3, a main supply circuit 4 connected with the trolley pole 5, an air pipe 6 leading from the pressure tank 6ª to the air valve 7, an air pipe 8 leading from the valve 7 to the brake cylinder 6ᵇ, and a fender 9, all of which may be of standard construction, except that I desire the fender to be hinged to the car to the brackets 10. A chain 11 connected to the fender bar 12 is adapted to be held in a clip 13 by means of a catch 14, which is preferably a pin mounted to slide in a slot provided for it in the clip, and held in its inner position by the spring 15, which is fastened to the clip or car. This chain serves to hold the forward end of the fender raised well above the track. At the forward part of the car and in a position substantially midway between the platform and the ground, I provide a series of depending brackets 16 and to each of these I bolt or rivet a metal guide 17 disposed lengthwise of the car. These guides are adapted to receive for sliding movement therein the frame work of my depressible buffer, which for lightness and strength is preferably formed of piping. The buffer parts are not rigidly connected, and comprise a series of parallel pipes 18, the inner end of each of which is slidably mounted in one of the guides 17 and each of which pipes has screwed on its outer end a T-coupling 19 between which and the guide 17 is interposed a coiled spring 20 which surrounds the slidable pipes 18 and holds them yieldingly in their extreme outer or forward position. A heavy coil spring 21 is stretched across from each coupling 19 to the adjacent coupling and connected thereto. Angle side bars 22 are screwed into the outer leg of the two outside couplings. The slidable pipes 18 are transversely slotted at their inner ends and each has a grooved roller 23 journaled in the slot, which rollers serve to arrest the outward movement of the slides under the influence of their springs 20.

A cord, chain or wire 24 is fastened to a pin or lug 25 on the bottom of the car and is passed through the slots in each of the slidable pipes 18 between the roller therein and the inner end of the pipe. The free end of the rope or wire is passed around a pulley 26 and connected to a spring 27, which in turn is connected by a link 28 to the outer end of a switch arm 29. This arm 29 is pivoted to a terminal 30 mounted in an insulated switch base 31 that is supported on a bracket 32 attached to the car body. The other terminal 33, which is bifurcated to receive the switch arm 29, is connected by a wire 34 with the main circuit 4. The terminal 30 is connected by a wire 35 with a solenoid 36 and continues as wire 37 and is grounded to the truck 38. The solenoid 36 is mounted on a plate 38 which is connected to the underside of the car. The core 39 of the solenoid is pivotally connected to a lever 40, which rocks on a fulcrum pin 41 rigid on the plate 38. This lever 40 has connected to it three rods, cables or chains 42, 43 and 44. The connection 42 leads from the lever to the pin 14 and serves to draw out the latch pin and release the fender so that it will drop to the ground. The connection 43 leads to a pin 45 which, when pulled out, permits a spring actuated switch 46 to snap open and interrupt the main line circuit 4 leading to the motors. This switch is mounted on a bracket 48 attached to the car, and the pin 45 is held by a spring 49 to prevent accidental opening of the switch. The pulley 26 is journaled on a bracket 52 under the car. The switch 46 has a handle readily accessible from the front of the car for resetting it. A spring 53 on the plate 38 serves to hold the lever 40 pressed against a stop 54 and hold the parts in the position shown in Fig. 3. The connection 44 passes to a normally closed valve 50 in a by-pass 51 connecting the air pipes 6 and 8 and shunting the motorman's air valve 7.

In operation, when any part of the buffer strikes a person, one or more of the slides 18 is thrust instantly inwardly against the cable 24, thereby acting to draw it about the pulley 26 and close the switch arm 29. This energizes the solenoid 36, which jerks the lever arm 40 so as to exert a pull on the several connections 42, 43 and 44, all of which act simultaneously and respectively to drop the fender, disconnect the motors and apply the air brakes. When a person strikes the coiled springs 21 he will be largely protected from injury by the buffer itself. The spring 27 takes up any excess pull from the cable 24 on the switch arm.

Obviously the details of construction may be variously changed and the relative location of parts on the car and the manner of attachment thereto modified without departing from the spirit of my invention.

Having thus described my invention, what I claim as new and desire to secure by Letters Patent, is:—

1. The combination with an electric car having a fender adapted to be lowered into operating position, of means normally holding the fender raised, an air brake system, a main supply circuit for the car motors, a switch in said circuit, a shunt circuit having a normally open switch, a motor connected in said shunt circuit, and a depressible buffer carried by the car in advance of the fender, means operated by the depression of the buffer to close said shunt circuit and energize said motor, and several means actuated by said motor which respectively release the fender, apply the air brakes and open the main circuit for the motors, substantially as described.

2. In an electric car, a fender normally held in raised position, a catch to hold up said fender, an air brake cylinder, an air tank, a pipe connecting said tank and cylinder, and a valve normally closing said pipe, a main motor circuit, a normally closed switch therein, operating connections leading to said catch, valve and switch, an electric means for simultaneously operating said connections, and a depressible buffer carried by the car in advance of the fender and adapted when depressed to energize said electric means, substantially as described.

3. The combination with a car having a vertically movable fender, means to hold the fender raised, a buffer carried by the car in front of the fender and comprising spring-pressed rods flexibly connected at their outer ends, a flexible operating connection adapted to be actuated by each or all of said rods, a motor, means controlled by the actuation of said connection to energize said motor, and means operated by said motor to release the fender, substantially as described.

4. The combination with a car having a vertically movable fender, means to hold the fender raised, a buffer carried by the car in front of the fender and comprising spring-pressed rods flexibly connected at their outer ends, a flexible operating connection adapted to be actuated by each or all of said rods, a motor, means controlled by the actuation of said connection to energize said motor, an air brake, and means operated by said motor to release the fender and apply said air brake, substantially as described.

5. The combination with a car having a fender pivotally connected thereto, of a buffer yieldingly mounted on the car in advance of the fender, said buffer comprising a coiled spring connecting the outer ends of sliding members, a catch to hold the free end of the fender elevated, and means movable responsive to the independent depression of any one of said sliding members for releasing said catch and dropping the fender, as and for the purposes described.

6. The combination with a car and a vertically adjustable fender and catch means to hold it elevated, of a depressible buffer carried by the car in advance of the fender and comprising a series of spaced brackets carried by the car, rods horizontally and independently movable in said brackets, spring means to keep the rods pressed forward, stops to arrest the forward movement of the rods, coiled springs connecting the outer ends of the rods, and a common control means actuated by any one of said independent rods and adapted to control said catch means for the fender, substantially as described.

7. The combination with a car having a main power circuit, a switch therein, a hinged fender and a catch to hold it elevated, of a depressible buffer carried by the car in advance of the fender, an electric control circuit, a switch in said control circuit, means controlled by the depression of said buffer to close said control switch, an electric motor energized by the closing of said circuit, and means operated by the motor to release said catch and drop the fender and to open said switch in the main power circuit.

8. The combination with a car having a hinged fender and a catch to hold it elevated, of a depressible buffer carried by the car in advance of the fender, an electric circuit, a switch in said circuit, means controlled by the depression of said buffer to close said switch, an electric motor energized by the closing of said circuit, and means operated by the motor to release said catch and drop the fender.

9. The combination with a car having a hinged fender and a catch to hold it elevated, of means to release said catch comprising a depressible buffer consisting of rods, means flexibly connecting said rods at their outer ends, guides through which the inner ends of the rods project, and spring means to hold the rods in their extreme forward position; a flexible connection attached to the car at one end, means to hold the connection in position to be moved by the depression of any of said buffer rods, and means operated by said connection to release said catch.

10. The combination with an electric car having a hinged normally raised fender and an air brake system, of a buffer comprising rods which extend forward of the car, guides in which said rods are slidably mounted and beyond which the rear ends of the rods project and are slotted, a flexible connection attached at one end to the car and passed through said slots, and several means operated by said connection when moved by any of the said rods, and adapted to simultaneously drop the fender, apply the air brakes and interrupt the current supply to the car.

In testimony whereof I affix my signature in presence of two witnesses.

JAMES E. HENDERSON.

Witnesses:
R. D. JOHNSTON, Jr.,
NOMIE WELSH.